(12) United States Patent
Datta Ray et al.

(10) Patent No.: US 7,020,589 B1
(45) Date of Patent: Mar. 28, 2006

(54) METHOD AND APPARATUS FOR ADAPTIVE TIMING OPTIMIZATION OF AN INTEGRATED CIRCUIT DESIGN

(75) Inventors: Partha P. Datta Ray, Saratoga, CA (US); Mikhail I. Grinchuk, Mountainview, CA (US); Pedja Raspopovic, Raleigh, NC (US)

(73) Assignee: LSI Logic Corporation, Milpitas, CA (US)

( * ) Notice: Subject to any disclaimer, the term of this patent is extended or adjusted under 35 U.S.C. 154(b) by 778 days.

(21) Appl. No.: 09/964,030

(22) Filed: Sep. 26, 2001

Related U.S. Application Data (60) Provisional application No. 60/236,589, filed on Sep. 29, 2000.

(51) Int. Cl.
*G06F 17/50* (2006.01)

(52) U.S. Cl. .................. 703/2; 716/6; 716/10
(58) Field of Classification Search .............. 703/2, 703/13; 716/6, 7, 9, 10
See application file for complete search history.

(56) References Cited

U.S. PATENT DOCUMENTS

| | | | |
|---|---|---|---|
| 4,698,760 A * | 10/1987 | Lembach et al. ............ 716/6 |
| 4,924,430 A * | 5/1990 | Zasio et al. ................. 716/6 |
| 5,495,419 A | 2/1996 | Rostoker et al. ............ 364/468 |
| 5,508,937 A * | 4/1996 | Abato et al. ................ 716/6 |
| 5,521,837 A * | 5/1996 | Frankle et al. .............. 716/10 |
| 5,909,376 A | 6/1999 | Scepanovic et al. ........ 364/491 |
| 5,983,008 A * | 11/1999 | Kumashiro et al. .......... 716/6 |
| 6,099,580 A | 8/2000 | Boyle et al. ................. 716/7 |
| 6,269,467 B1 * | 7/2001 | Chang et al. ................ 716/1 |
| 6,622,291 B1 * | 9/2003 | Ginetti ....................... 716/9 |
| 6,643,832 B1 * | 11/2003 | Ray et al. ................... 716/6 |
| 6,662,348 B1 * | 12/2003 | Naylor et al. ............... 716/9 |
| 6,763,506 B1 * | 7/2004 | Betz et al. .................. 716/6 |
| 2002/0069396 A1 * | 6/2002 | Bhattacharya et al. ....... 716/7 |

* cited by examiner

*Primary Examiner*—Thai Phan
(74) *Attorney, Agent, or Firm*—Westman, Champlin & Kelly, P.A.

(57) ABSTRACT

An optimization apparatus and method optimizes a functional block within a netlist of an integrated circuit design. A corresponding delay value is assigned to each of a plurality of pins of the block. Each pin corresponds to a respective signal path through the block. The delay values together form a delay value combination, which is selected from a continuous set of possible combinations in which each combination in the set satisfies a predetermined criteria. A circuit configuration for the block is then generated with a plurality of logic cells that are interconnected in the netlist such that the respective signal paths have delays through the block that are based on the corresponding delay values.

28 Claims, 3 Drawing Sheets

METHOD AND APPARATUS FOR ADAPTIVE TIMING OPTIMIZATION OF AN INTEGRATED CIRCUIT DESIGN

CROSS-REFERENCE TO RELATED APPLICATIONS

Cross reference is made to U.S. Ser. No. 09/964,011, filed on even date herewith, which issued as U.S. Pat. No. 6,643,832 and is entitled "VIRTUAL TREE-BASED NETLIST MODEL AND METHOD OF DELAY ESTIMATION FOR AN INTEGRATED CIRCUIT DESIGN."

This application claims the benefits of U.S. Provisional Application No. 60/236,589, filed Sep. 29, 2000, and entitled "METHOD AND APPARATUS FOR ADAPTIVE TIMING OPTIMIZATION OF AN INTEGRATED CIRCUIT DESIGN".

BACKGROUND OF THE INVENTION

The present invention relates to the design of semiconductor integrated circuits, and more specifically to a design automation system and method for optimizing delay through a group of cells in the integrated circuit design prior to placement and routing.

Semiconductor integrated circuits are designed and fabricated by first preparing a schematic diagram or hardware description language (HDL) specification of a logical circuit in which functional elements are interconnected to perform a particular logical function. With standard cell technology, the schematic diagram or HDL specification is synthesized into standard cells of a specific cell library.

Each cell corresponds to a logical function unit which is implemented by one or more transistors that are optimized for the cell. The logic designer selects the cells according to the number of loads that are attached to the cell, as well as an estimated interconnection required for routing. The cells in the cell library are defined by cell library definitions. Each cell library definition includes cell layout definitions and cell characteristics. The cell layout definition includes a layout pattern of the transistors in the cell, geometry data for the cell's transistors and cell routing data. The cell characteristics include a cell propagation delay and a model of the cell's function. The propagation delay is a function of the internal delay and the output loading of the cell.

A series of computer-aided design tools generate a netlist from the schematic diagram or HDL specification of the selected cells and the interconnections between the cells. The netlist is used by a floor planner or placement tool to place the selected cells at particular locations in an integrated circuit layout pattern. The interconnections between the cells are then routed along predetermined routing layers. The design tools then determine the output loading of each cell as a function of the number of loads attached to each cell (i.e. "fanout"), the placement of each cell and the routed interconnections.

A timing analysis tool is then used to identify timing violations within the circuit. The time it takes for a signal to travel along a particular path or "net" from one sequential element to another depends on the number of cells in the path, the internal cell delay, the number of loads attached to the cells in the path, the length of the routed interconnections in the path and the drive strengths of the transistors in the path.

A timing violation may be caused by a number of factors. For example, a particular cell may not have a large enough drive strength to drive the number of loads that are attached to that cell. Also, exceptionally long routing paths may cause timing violations. Timing violations are eliminated by making adjustments at each stage in the layout process. For example, an under-driven cell may be fixed by changing the logic diagram to include a cell having a larger drive strength. Alternatively, the logic diagram can be changed to divide the loads between one or more redundant cells or buffer cells. An exceptionally long routing path can be corrected by adjusting the placement of the cells.

Once the timing violations have been corrected, the netlist, the cell layout definitions, the placement data and the routing data together form an integrated circuit layout definition, which can be used to fabricate the integrated circuit.

Optimization algorithms are now being used to assist the logic designer in optimizing areas of the logic design that contain large, multiple-input function blocks, such as large AND, OR and XOR blocks and large buffer trees having multiple "fanouts". These blocks can be implemented with a variety of circuit configurations. An optimization algorithm optimizes these large function blocks by expanding the blocks into smaller logical functions based on certain optimization decisions. Unfortunately, prior to placement and routing, there is little timing information on which to base the optimization decisions. Optimization decisions are based on only rough timing estimates of the delay through each logical function and typical routing path lengths. This is particularly true when the logic design is being synthesized into generic cells, as opposed to cells of a particular cell library or technology. In the typical approach, the initial placement is not timing driven since little or no timing information is available at this stage in the fabrication process.

Once the "optimized" netlist has been placed and its interconnections are routed, timing information is then fed back to the design tools as described above for further optimization. The typical approach is to carry out gate tree optimization when the information is known as to the arrival time of all input signals. Buffer trees for cells having a large-fanout are optimized when the "remaining" time for each output signal is known.

The design verification tools typically identify "critical" paths that exceed a predetermined delay criteria. Once these critical paths have been identified, expansion of multi-input logical functions, placement and routing are optimized together in an iterative fashion to reduce delay through these critical paths. However, when a change is made to one of these critical paths, such as by expanding the logical function into a different circuit configuration, by changing placement or by changing one or more routing paths to produce a local improvement in delay, these changes can affect the timing of other paths. This usually results in a very slow timing convergence and can often result in the inability to achieve a real delay minimum since each possible local optimization can improve the currently critical path only to make other paths even worse.

Improved optimization techniques are desired for optimizing a logical circuit with more accurate delay estimation prior to placement and routing.

SUMMARY OF THE INVENTION

One aspect of the present invention relates to a method of optimizing a functional block within a netlist of an integrated circuit design. A corresponding delay value is assigned to each of a plurality of pins of the block. Each pin corresponds to a respective signal path through the block.

The delay values together form a delay value combination, which is selected from a continuous set of possible combinations in which each combination in the set satisfies a predetermined criteria. A circuit configuration is then generated for block with a plurality of logic cells that are interconnected in the netlist such that the respective signal paths have delays through the block that are based on the corresponding delay values.

Another aspect of the present invention relates to a method of optimizing a functional block within a netlist of an integrated circuit design in which a current penalty value is assigned to each of a plurality of pins of the block. Each pin corresponds to a respective signal path through the block. A current delay value is assigned to each of the plurality of pins of the block based on the corresponding current penalty value. At least one of the pins is identified as a critical pin in the netlist. The current penalty value of the critical pin is updated based on a history of the respective pin being identified as the critical pin. The step of assigning a current delay value to each of the pins is repeated using the updated current penalty value. A circuit configuration for the block is then generated with logic cells that are interconnected in the netlist such that the respective signal paths through the block have delays that are based on the current delay values.

Another aspect of the present invention relates to a computer-readable medium comprising instructions readable by a computer-aided design tool for optimizing a functional block within a netlist of an integrated circuit. When executed, the instructions cause the tool to assign a current penalty value to each of a plurality of pins of the block, wherein each pin corresponds to a respective signal path through the block. The tool assigns a current delay value to each of the plurality of pins of the block based on the corresponding current penalty value and identifies at least one of the pins as a critical pin in the netlist. The tool updates the current penalty value of the critical pin based on a history of the respective pin being identified as the critical pin in step and repeats the step of assigning a current delay value to each of the pins using the updated current penalty value. A circuit configuration for the block is then generated with logic cells that are interconnected in the netlist such that the respective signal paths through the block have delays that are based on the current delay values.

Yet another aspect of the present invention relates to an integrated circuit netlist having a functional block, which is optimized by a process. According to the process, a current penalty value is assigned to each of a plurality of pins of the block, wherein each pin corresponds to a respective signal path through the block. A current delay value is assigned to each of the plurality of pins of the block based on the corresponding current penalty value. At least one of the pins is identified as a critical pin in the netlist. The current penalty value of the critical pin is updated based on a history of the respective pin being identified as the critical pin. The process repeats the step of assigning a current delay value to each of the pins using the updated current penalty value. A circuit configuration is then generated for the block with logic cells that are interconnected in the netlist such that the respective signal paths through the block have delays that are based on the current delay values.

DETAILED DESCRIPTION OF ILLUSTRATIVE EMBODIMENTS

Figure 1:
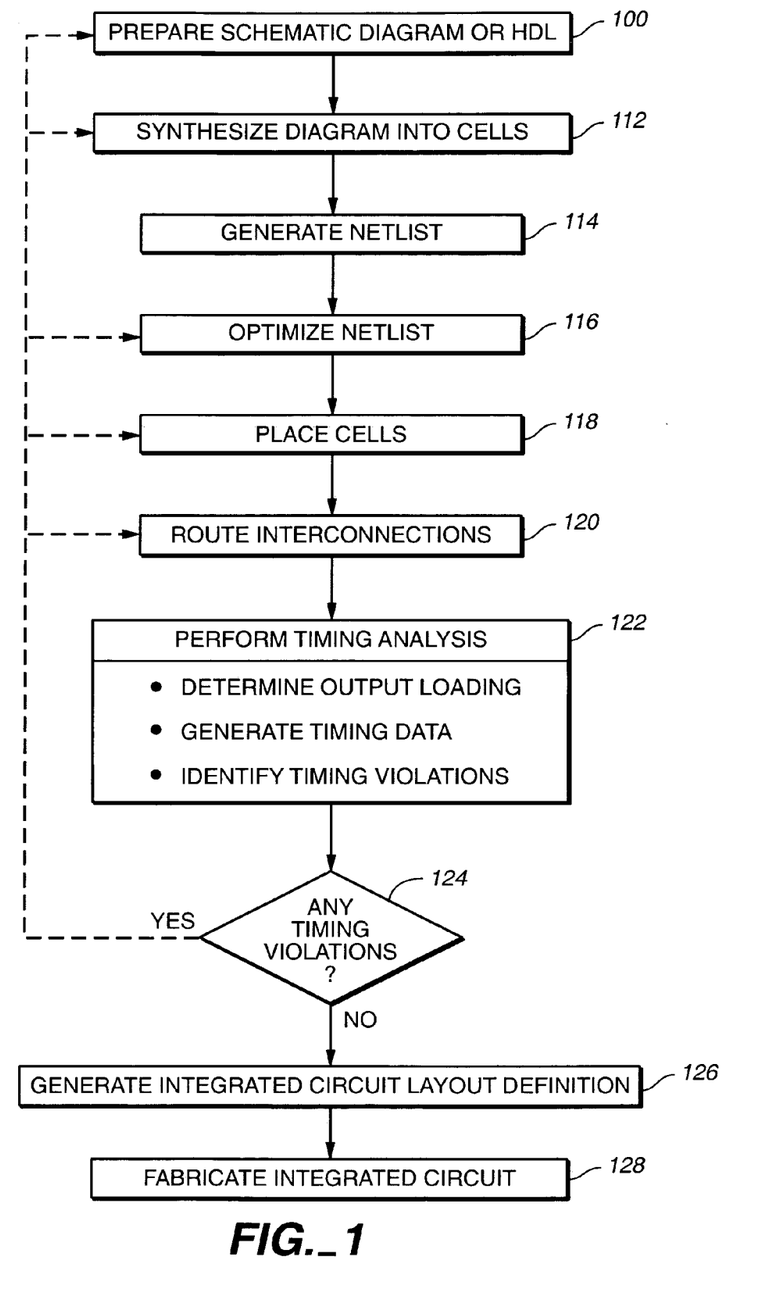
FIG. 1 is a flowchart of a layout process in which an optimization algorithm can be used according to one embodiment of the present invention.

FIG. 1 is a flowchart of a layout process in which a logic optimization algorithm can be used according to one embodiment of the present invention. The first step in the layout process is to prepare a schematic diagram or HDL specification in which functional elements are interconnected to perform a particular logical function, at step 100. At step 112, the schematic diagram or HDL specification is synthesized into cells of a predetermined cell library. Each cell library has an associated cell definition having physical data and timing characteristics associated with that cell. In one embodiment, the diagram is synthesized into a generic cell library that can be mapped into a specific cell library for a particular manufacturer or technology in subsequent process steps. In another embodiment, the diagram is synthesized directly into a specific cell library.

With a generic cell library, the cell characteristics would include estimates of typical cell propagation delays and a generic model of the cell's function. The cell layout definition would include an estimated layout pattern of the transistors in the cell, estimated geometry data for the cell's transistors and estimated cell routing data. These estimates can be generated in a variety of ways, such as with empirical data from a variety of specific cell libraries.

At step 114, the design tools generate a netlist of the selected cells and the interconnections between the cells. In a typical logic diagram or HDL specification, the netlist would include one or more blocks of large, multiple-input or multiple-output logic structures that can be expanded later into tree-like structures of smaller logic functions or cells. Two common variants of these structures include multiple-input logic functions such as large trees of AND, OR, and XOR gates, and any inversions thereof at their inputs or outputs, and large buffer trees, which are often inserted into a netlist to distribute signals from cells having outputs pins with large fanouts (i.e. large output loading). Each of these structures can be implemented with a variety of internal circuit configurations, with each configuration resulting in a potentially different propagation delay from a particular input to a particular output. Therefore, one of these configurations may be more beneficial than another, depending on the arrival times of signals on each pin of the logic block, the required arrival times for each pin and the timing of surrounding circuitry that interfaces with the block.

At step 116, an optimization algorithm optimizes the entire netlist by expanding each of these multiple-input and multiple-output blocks into an optimal one of its respective circuit configurations and providing resulting delay estimates for each structure to subsequent steps in the layout process. However, the netlist optimization is performed prior to placement and route. Therefore, it is difficult to select the optimum circuit configurations since timing information from placement and route is not yet available.

The optimization algorithm of the present invention, performed at step 116, overcomes these difficulties by considering a "continuous space" of tree-like delay vectors for each of the multiple-input and multiple-output blocks that are being optimized during the optimization procedure. The optimization algorithm investigates different optimization outcomes by the algorithm, which yields a continuous space of delay vectors for each block, as opposed to a discrete set of delay values that would traditionally be generated when considering gate and fanout delays in the prior art. The continuous set of delay values are essentially points on an operating locus defined by two inequalities that are described in more detail below. In existing delay models, the delay values can only be specified in terms of integer multiples of gate and/or fanout buffer delays.

In addition, the optimization algorithm used in step 116 proportionately penalizes the paths that have been "critical" in past iterations of the algorithm more often than other paths, rather than concentrating on the current "critical" path only. Since in most circuits, only a few paths actually turn out to be comparably "critical", the optimization algorithm employed at step 116 tracks the delay behavior of all such paths in subsequent iterations. The algorithm ensures that these paths are optimized more heavily in these later iterations. This adaptive feature of the algorithm confers a learning scheme to the algorithm, where the algorithm learns from historic monitoring of "criticality". The algorithm optimizes both gate trees and fanout buffer trees simultaneously, as opposed to optimizing them in separate sequential phases.

Using this procedure, the optimization algorithm optimizes gate trees and fanout buffer trees into circuit configurations that are timing-based, which provides very good delay estimates for placement and routing in steps 118 and 120. The optimized circuit configurations provide fairly accurate delay estimations that are based on the levels of logic in each optimized signal path. The placement and routing steps can therefore be timing-driven, resulting in a more effective initial placement and route.

At step 118, the cells in the optimized netlist are placed by arranging the cells in particular locations to form a layout pattern for the integrated circuit. Once the cells have been placed, the interconnections between the cells are routed, at step 120, along predetermined routing layers.

A timing analysis tool is used, at step 122, to generate timing data for the electrical signal paths and to identify any timing violations. The timing analysis tool first determines the output loading of each cell based on the routed interconnections of that cell and the input loading of the driven cells. Based on the output loading of each cell, the timing analysis tool generates timing data and identifies any timing violations. A timing violation occurs when a signal does not reach a particular pin in the netlist at within an appropriate time window. The optimization algorithm performed at step 116 optimizes large, multiple-input and multiple-output blocks to reduce or eliminate timing violations that would otherwise occur after placement and routing in steps 118 and 120. This reduces the number of design iterations required to provide an integrated circuit that has no timing violations. If there are any remaining timing violations, at step 124, the logic designer and/or design tools can return to prior process steps, as indicated by dashed line 123, to correct these timing violations. However, since placement and routing steps were timing-driven, the number of design iterations through these process steps are significantly reduced are eliminated.

Once all of the timing violations have been corrected, an integrated circuit layout definition is prepared, at step 126, which includes a netlist of the selected cells and the interconnections between the cells. The definition further includes placement data for the cells, routing data for the interconnections between the cells and cell layout definitions. The cell layout definitions include layout patterns of the interconnected transistors, local cell routing data and geometry data for the interconnected transistors. The integrated circuit layout definition is then used to fabric the integrated circuit at step 128.

Figure 2:
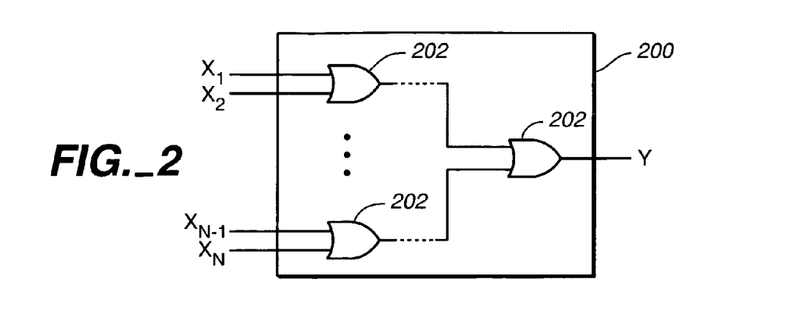
FIG. 2 is a diagram of a multi-input logical function block (or gate tree) that can be optimized with the optimization algorithm of the present invention.

1. Consideration of a Continuous Space of Delay Vectors Based on Two Inequalities FIG. 2 is a diagram of a multi-input logical function block (or gate tree) 200 that can be optimized with the optimization algorithm of the present invention. In this example, gate tree 200 includes an N-input tree of binary logic OR gates 202. However, other types of gates can be used in alternative embodiments, such as binary AND gates, binary XOR gates and combinations of these types of gates. Also, these types of gates can have inversions on their inputs and/or outputs. In addition, the gates in gate tree 200 can have any number of inputs, such as three inputs or four inputs.

In the example shown in FIG. 2, gate tree 200 has a plurality of inputs (or "pins") $x_1, x_2, \ldots,$ and $x_N$ and an output (or pin) "y". Gate tree 200 has a logical function $y = x_1$ OR $x_2$ OR $\ldots$ OR $x_N$, which can be implemented with a variety of different configurations of binary OR gates 202. Each different configuration can have a different delay from a specific input $x_i$ to output y, where i is a positive integer index ranging from 1 to N.

For any given configuration, a delay vector $(d_1, \ldots, d_N)$ can be defined, where each delay variable $d_i$ in the vector represents the propagation delay from a respective input $x_i$ to the output y. Prior to selecting a particular one of the various configurations of gate tree 200, the optimization algorithm used in step 116 of FIG. 1 considers a continuous set of these delay vectors, wherein each delay vector in the set satisfies two inequalities. First, assuming each binary OR gate 202 has a unit delay, all delay vectors $(d_i, \ldots, d_N)$ in the continuous set of vectors satisfy the inequality:

$$\sum_{i=1}^{N} \frac{1}{2^{d_i}} \leq 1 \qquad \text{EQ. 1}$$

Different paths can have different delays. If Equation 1 is an equality, then the optimization algorithm cannot improve the delay through one of the paths without increasing the delay through another of the paths. Otherwise, the logical function of gate tree 200 can be implemented in a circuit configuration (which is not necessarily symmetrical) such that the delay from input $x_i$ to output y does not exceed $d_i$, or can exceed $d_i$ by a small amount (in the worst case it is the gate delay, e.g., 1).

In addition, each delay value in each of the delay vectors in the continuous set of vectors also satisfies the inequality:

$$d_i \geq 1 \qquad \text{EQ. 2}$$

If a given delay vector $(d_1, \ldots, d_N)$ does not satisfy these two inequalities, then the delay vector cannot be implemented for gate tree 200. If, for a given delay vector, Equation 1 is an equality, then the logical function of gate tree 200 can be implemented by a tree of binary OR gates that are interconnected in a configuration such that the delay from input $x_i$ to output y equals $d_i$. For each delay vector that merely satisfies the inequalities in Equations 1 and 2, but does not form an equality, the logical function of gate tree 200 can be implemented in a circuit configuration (which is not necessarily symmetrical) such that the delay from input $x_i$ to output y approximates, and in the worst case does not exceed, $d_i$.

The model given by the inequalities of Equations 1 and 2 above can be generalized if the delay through each gate is considered to be $D_1$, rather than unity. The particular value for $D_1$ can be a value obtained from a specific technical library for those types of gates or can be a generic value representative of similar gates from a variety of libraries. The two inequalities therefore become:

$$\sum_{i=1}^{N} \frac{1}{2^{d_i/D_1}} \leq 1 \qquad \text{EQ. 3}$$

$$d_i \geq D_1 \qquad \text{EQ. 4}$$

Figure 3:
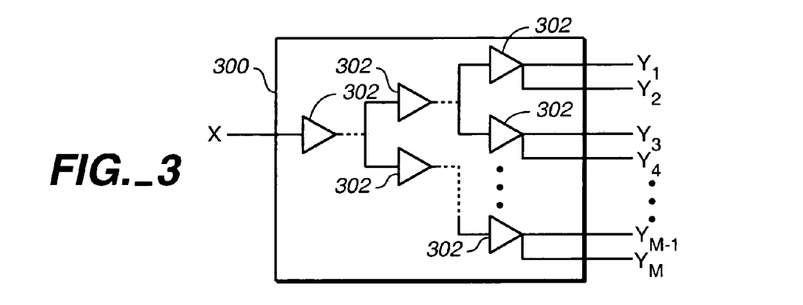
FIG. 3 is a diagram of a multi-output fanout distribution block (or buffer tree) that can be optimized with the optimization algorithm of the present invention.

Similar inequalities can be defined for multiple-fanout distribution blocks that are inserted to distribute signals from cells having multiple fanouts. FIG. 3 is a diagram of a multiple-fanout block (or buffer tree) 300 having an input "X", a plurality of outputs $y_1, y_2, \ldots y_M$ and buffers 302. In this example, each buffer 302 has a fanout count of two. If $D_2$ represents the delay through each buffer 302 in buffer tree 300, M is the fanout count of buffer tree 300 and Z is the fanout count of each individual buffer 302 in tree 300, the corresponding inequalities become:

$$\sum_{i=1}^{M} \frac{1}{2^{d_i/D_2}} \leq 1 \qquad \text{EQ. 5}$$

$$d_i \geq D_2 \qquad \text{EQ. 6}$$

where delay vector $(d_1, \ldots, d_M)$ represents the delays from input "X" to outputs $y_1 \ldots y_M$, respectively.

In one embodiment, the values of $D_1$ and $D_2$ are properties of a whole technology library or set of libraries, not properties of an individual gate or cell. The values of $D_1$ and $D_2$ can be thought of as amounts of extra delay that are needed to approximate the added delay through the multiple-input block (or multiple-output block) when the number of inputs to (or outputs from) the block are increased by a factor of two.

In the model used by the optimization algorithm, the internal structures of the blocks are not specified. An actual technology library might not include binary gates. But, the dependence delay(fan-in) of the block has approximately the same logarithmic behavior when implemented with binary gates as when implemented with gates having other numbers of inputs. As such, a "physical" model (using actual technology gates) can be approximated by a model of binary trees, where each node (binary gate or binary buffer) has a similar delay as an actual technology gate. Parameters $D_1$ and $D_2$ are delays of these "abstract" binary gates/buffers.

The following example shown how the value of $D_1$ can be calculated according to one embodiment of the present invention. Other methods can also be used. Suppose a technology library has 3-input gates (and no other gates), with each gate having delay "1". For an N-input functional block, the minimum possible delays of an N-input tree for different values of N are found. Table 1 shows an example of the delays for various values of "N".

TABLE 1

| | |
|---|---|
| N = 2 | delay = 1 |
| N = 4 | delay = 2 |
| N = 8 | delay = 2 |
| N = 16 | delay = 3 |
| N = 32 | delay = 4 |
| N = 64 | delay = 4 |
| N = 128 | delay = 5 |
| N = 256 | delay = 6 |
| N = 512 | delay = 6 |
| N = 1024 | delay = 7 |

The value of $D_1$ is the best-fit (or asymptotical) coefficient in the approximate formula:

$$\text{delay}(N) \sim D_1 \log_2 N \qquad \text{EQ. 7}$$

In the above-example, it can be found that $D_1 = 1/\log_2 3$. This is the limit of $\text{delay}(N)/\log_2 N$, when N approaches infinity. In the example, there were no binary gates, but the behavior of delay(N) is approximately the same as if there were only binary gates with delay $D_1$ in the library. When the multiple-input block has twice as many inputs, the added delay through the block is equivalent to the delay through one more level of these "imaginary" binary gates. However, other coefficients for $D_1$ and $D_2$ and methods of calculating these coefficients can also be used with the optimization algorithm of the present invention.

For multiple-input blocks, the goal is to find the values of $d_1, \ldots, d_N$ that satisfy the inequalities of Equations 3 and 4 and that result in the arrival time at the output of the block having a minimum value. In the general case, the inputs $x_1, \ldots, x_N$ of the block have arrival times $arr_1, \ldots, arr_N$, respectively. The arrival time at the output of the block is therefore, $$\max(arr_{i+d_i}), \text{ for all } i \qquad \text{EQ. 8}$$

The optimization problem then becomes finding the minimum arrival time, given by Equation 8, for all vectors $d_1, \ldots, d_N$ that satisfy the inequalities of Equations 3 and 4, and the corresponding values of $d_1, \ldots, d_N$.

For multiple-output blocks, the goal is to find the values of $d_1, \ldots, d_M$ that satisfy the inequalities of Equations 5 and 6 and that result in the required arrival time at i-th output of the block having a maximum value. In the general case, the outputs $y_1, \ldots, y_M$ of the block have required arrival times $reqarr_1, \ldots, reqarr_M$, respectively. The required arrival times at the output of the block is therefore, $$\min(reqarr_i - d_i), \text{ for all } i \qquad \text{EQ. 9}$$

The optimization problem then becomes to find the maximum required arrival time, given by Equation 9, for all vectors $d_1, \ldots, d_M$ that satisfy the inequalities of Equations 5 and 6, and the corresponding values of $d_1, \ldots, d_M$.

For a balanced tree example, where all inputs have the same arrival time, the optimization problem has solutions of the following form under the constraints of the inequalities in Equations 3 and 4:

$$d_1 = \ldots = d_N = D_1 \log_2 N \qquad \text{EQ. 10}$$

The value $D_1 \log_2 N$ represents the best solution that can be obtained for a balanced tree. If all $d_i$'s are not equal to one another, then the maximum $d_i$ is greater than $D_1 \log_2 N$.

Similarly, under the constraints of the inequalities in Equations 5 and 6, where all outputs have the same required arrival time, the fanout delay vectors $(d_1, \ldots, d_M)$ have solutions of the form:

$$d_1 = \ldots = d_M = D_2 \log_2 M \quad \text{EQ. 11}$$

The above two equations represent the gate tree and buffer tree delay vectors, respectively, which are estimated by the delay model for a balanced tree configuration.

2. Algorithms for Delay Vector Computation and Tree Optimization

The optimization algorithm used in step 116 of FIG. 1 considers multiple-input symmetric logic blocks and multiple-fanout distribution blocks as objects with delay vectors satisfying the inequalities of Equations 3–4 and 5–6, respectively. The internal implementations of these blocks are not known by the algorithm, only their possible delay behavior. The optimization algorithm determines the best choice of coefficients, $d_i$, that can minimize total delay (e.g. paths having the smallest timing margin) in the netlist. In one embodiment, the algorithm derives the coefficients by imposing "penalties" on input pins of multiple-input blocks and output pins of multiple-fanout blocks that reside in a "critical" path in the netlist. The algorithm keeps track of the imposed penalties with a penalty vector $(p_1, \ldots, p_N)$ for each multiple-input block having a delay vector of length N and with a penalty vector $(p_1, \ldots, p_M)$ for each multiple-fanout block having a delay vector of length M. In each penalty vector, each $p_i$ is a positive number. The algorithm considers the delay vectors $(d_i, \ldots, d_N)$ that satisfy the inequalities in Equations 3 and 4 for gate input delay, and delay vectors $(d_i, \ldots, d_M)$ that satisfy the inequalities in Equations 5 and 6 for fanout delay, so that the sum:

$$S = \sum_{i=1}^{} p_i d_i \quad \text{EQ. 12}$$

is minimized, where $i=1, \ldots, N$ for multiple-input blocks and $i=1, \ldots, M$ for multiple-fanout blocks.

Figure 4:
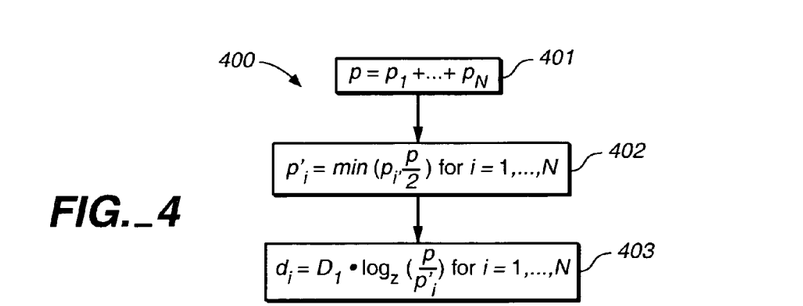
FIG. 4 is a flow chart of a delay vector computation algorithm for calculating a delay vector for a multi-input logic block given a corresponding penalty vector.
Figure 5:
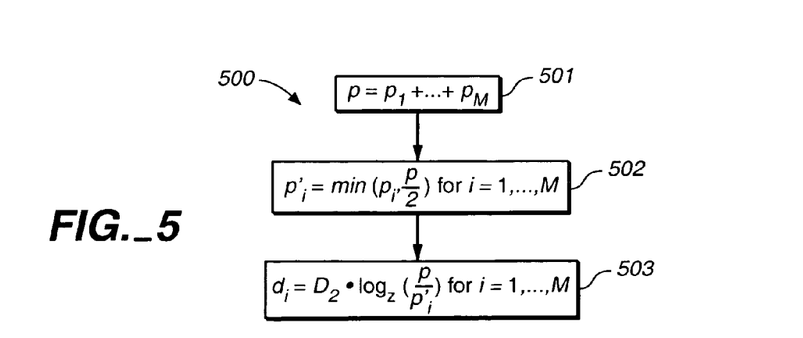
FIG. 5 is a flow chart of a delay vector computation algorithm for calculating a delay vector for a multi-fanout block given a corresponding penalty vector.
Figure 6:
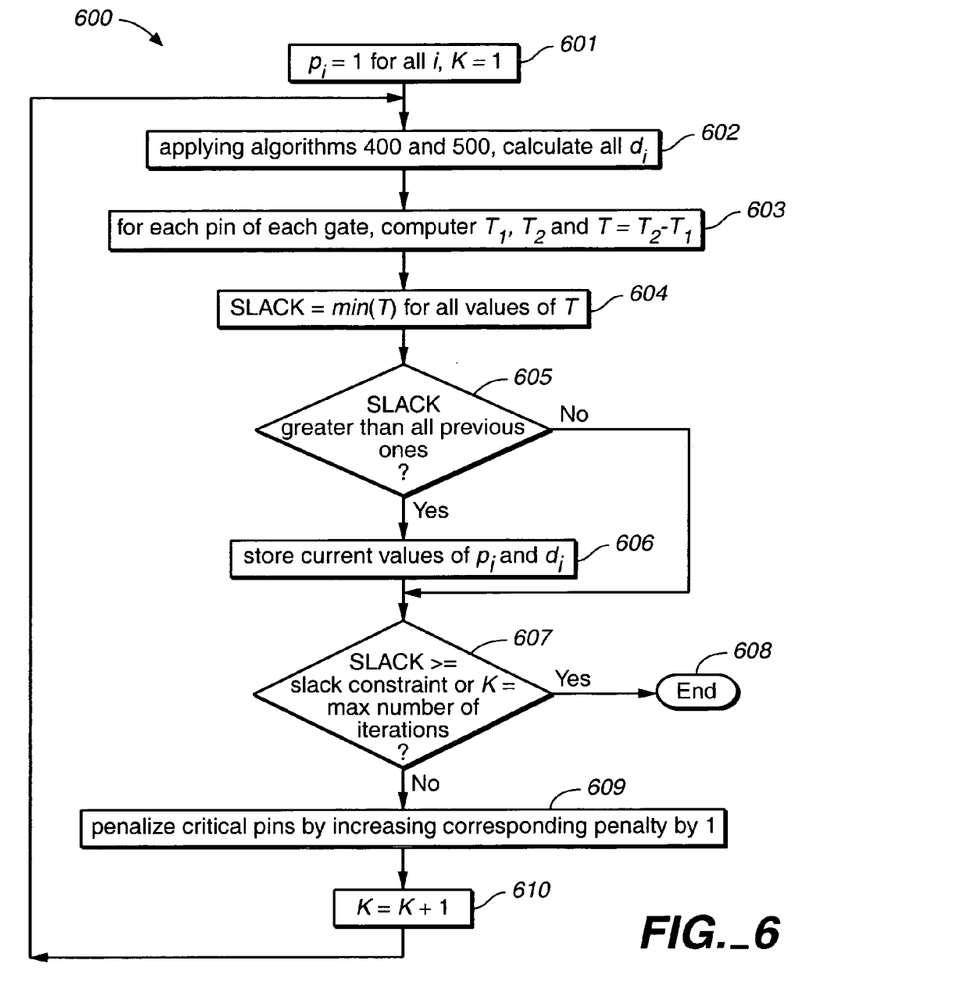
FIG. 6 is a flow chart illustrating an overall optimization algorithm for computing the corresponding penalty vectors and for calling the delay computation algorithms shown in FIGS. 4 and 5.

FIGS. 4–6 are flow charts, which illustrate the steps performed for providing a solution to the optimization problem shown in the above equation. In FIG. 4 is a flow chart illustrating a delay vector computation algorithm 400 for computing a respective delay vector $(d_i, \ldots, d_N)$ for each multiple-input block in the netlist that is being optimized. The algorithm finds the delay vector $(d_i, \ldots, d_N)$ that satisfies the inequalities in Equations 3 and 4 given a corresponding penalty vector $(p_1, \ldots, p_N)$ for that block. At step 401, delay computation algorithm 400 finds the sum "p" of the current penalty values in penalty vector $(p_1, \ldots, p_N)$.

At step 402, algorithm 400 generates a filtered penalty vector $(p'_1, \ldots, p'_N)$ for the multiple-input block in which individual penalty values $p'_i$ are filtered according to predetermined filter function. In one embodiment, each value $p_i$ is replaced with the minimum of the current penalty value $p_i$ and one-half of the sum of all of the current penalty values. The filter function performed at step 402 prevents one of the penalty values from becoming too large and dominating the other penalty values. If one penalty value gets too large, it may cause the solution computed in step 403 to violate the inequality of Equation 3 provided above.

At step 403, algorithm 400 determines the delay values $d_i$ by the formula:

$$d_i = D_1 \cdot \log_2\left(\frac{p}{p'_i}\right) \text{ for } i = 1, \ldots, N \quad \text{EQ. 13}$$

The fraction $p/p'_i$ represents the relative criticality of each path. This is essentially a fraction of the total penalty for the multiple-input block that is attributed to a particular pin. If that pin is in a critical path, its corresponding penalty value $p'_i$ will be relatively large and will reduce the corresponding delay value $d_i$ along that critical path. The resulting delay vector $(d_1, \ldots, d_N)$ represents a current delay vector solution given the current penalty vector $(p_1, \ldots, p_N)$ for the multiple-input block. This delay vector satisfies the inequalities of Equations 3 and 4 for the particular multiple-input block that is presently being optimized. This algorithm is executed for all of the multiple-input blocks in the netlist being optimized.

FIG. 5 is a flow chart illustrating a delay computation algorithm 500 for computing the delay vector $(d_1, \ldots, d_M)$ for each of the multiple-fanout blocks being optimized. At step 501, algorithm 500 computes the sum of all penalty values in the penalty vector $(p_1, \ldots, p_M)$. At step 502, algorithm 500 calculates a filtered penalty vector $(p'_1, \ldots, p'_M)$ by filtering individual ones of the current penalty values $p_i$ to prevent one of the penalty values from dominating the others and breaking the solution. In one embodiment, algorithm 500 replaces each current penalty value $p_i$ with the minimum of $p_i$ and one-half of the sum of all penalty values. At step 503, algorithm 500 calculates each delay value $d_i$ of the delay vector $(d_i, \ldots, d_M)$ according to the equation:

$$d_i = D_2 \cdot \log_2\left(\frac{p}{p'_i}\right) \text{ for } i = 1, \ldots, M \quad \text{EQ. 14}$$

FIG. 6 is a flow chart illustrating an overall optimization algorithm 600 for computing the respective penalty vectors and for calling the delay computation algorithms shown in FIGS. 4 and 5. At step 601, algorithm 600 initializes the penalty vectors for all multiple-input blocks and multiple-fanout blocks in the netlist that are being optimized. The penalty value for each input or output of these blocks are initialized to a default value, such as "1". Also, an iteration count K is initialized to "1".

At step 602, algorithm 600 calls algorithms 400 and 500 once for each block being optimized in order to compute a corresponding delay vector, given the current penalty vectors assigned in step 601. In the first iteration, all delay values in a particular delay vector are equal to one another since all penalty values are equal.

At step 603, algorithm 600 computes, for each input pin and output pin of each cell or gate in the netlist, an estimated arrival time $T_1$ at that pin, an estimated required arrival time $T_2$ at that pin and a slack time T for that pin, where $T=T_2-T_1$. The slack time T represents the amount of time a signal would need to be delayed at a particular pin before a timing error would occur.

If the algorithm knows: (a) the arrival time $T_1$ for each input of the overall logic design; (b) the required arrival time $T_2$ for each output of the overall logic design; and (c) the delay of each block (either multi-input or multi-output) in the logic design, then the algorithm can compute $T_1$ and $T_2$ for each internal wire of the design. An example of this computation is shown with respect to FIG. 7.

Figure 7:
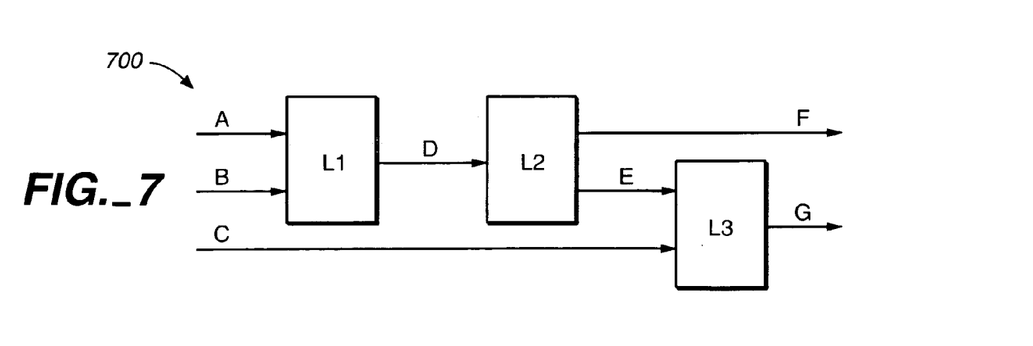
FIG. 7 is a block diagram which illustrates an overall logic design having internal logic blocks.

FIG. 7 is a block diagram, which illustrates an overall logic design 700 having internal logic blocks (either multi-input or multi-output) L1, L2 and L3 to be optimized. Logic design 700 has inputs A, B and C, internal wires D and E, and outputs F and G. Blocks L1 and L3 each have two inputs and one output, and block L2 has one input and two outputs. Suppose, as a result of step 602 in FIG. 6, blocks L1, L2 and L3 have the delays (i.e. delay vectors) shown in Table 2:

TABLE 2

| L1: | delay from A to D = 2 |
|---|---|
|  | delay from B to D = 3 |
| L2: | delay from D to F = 1 |
|  | delay from D to E = 2 |
| L3: | delay from E to G = 3 |
|  | delay from C to G = 1 |

Then, let the arrival times $T_1$ for inputs A, B and C be 1, 2 and 3, respectively. Let the required arrival times $T_2$ for outputs F and G be 15 and 20, respectively. The data above is the input information for timing analysis. Now, the algorithm (or associated timing analysis tool) can compute $T_1$ for each of the points A . . . G as follows, where "delay(X,Y)" means "delay the from point X to point Y":

TABLE 3

| $T_1(A)$ | = | 1 (given) |
|---|---|---|
| $T_1(B)$ | = | 2 (given) |
| $T_1(C)$ | = | 3 (given) |
| $T_1(D)$ | = | max($T_1(A)$ + delay(A,D), |
|  |  | $T_1(B)$ + delay(B,D)) |
|  | = | max(1 + 2, 2 + 3) = 5 |
| $T_1(E)$ | = | $T_1(D)$ + delay(D,E) = 5 + 2 = 7 |
| $T_1(F)$ | = | $T_1(D)$ + delay(D,F) = 5 + 1 = 6 |
| $T_1(G)$ | = | max($T_1(E)$ + delay(E,G), |
|  |  | $T_1(C)$ + delay(C,G)) |
|  | = | max(7 + 3, 3 + 1) = 10 |

Similar calculations are made for $T_2$:

TABLE 4

| $T_2(F)$ | = | 15 (given) |
|---|---|---|
| $T_2(G)$ | = | 20 (given) |
| $T_2(E)$ | = | $T_2(G)$ − delay(E,C) = 20 − 3 = 17 |
| $T_2(C)$ | = | $T_2(G)$ − delay(C,G) = 20 − 1 = 19 |
| $T_2(D)$ | = | min($T_2(F)$ − delay(D,F), |
|  |  | $T_2(E)$ − delay(D,E)) |
|  | = | min(15 − 1, 17 − 2) = 14 |
| $T_2(A)$ | = | $T_2(D)$ − delay(A,D) = 14 − 2 = 12 |
| $T_2(B)$ | = | $T_2(D)$ − delay(B,D) = 14 − 3 = 11 |

Also, all slacks, T, can be calculated as follows:

TABLE 5

| T(A) = $T_2(A)$ − $T_1(A)$ = 12 − 1 = 11 |
|---|
| T(B) = $T_2(B)$ − $T_1(B)$ = 11 − 2 = 9 |
| T(C) = $T_2(C)$ − $T_1(C)$ = 19 − 3 = 16 |
| T(D) = $T_2(D)$ − $T_1(D)$ = 14 − 5 = 9 |
| T(E) = $T_2(E)$ − $T_1(E)$ = 17 − 7 = 10 |
| T(F) = $T_2(F)$ − $T_1(F)$ = 15 − 6 = 9 |
| T(G) = $T_2(G)$ − $T_1(G)$ = 20 − 10 = 10 |

At step 604 in FIG. 6, algorithm 600 sets a global slack parameter "SLACK" equal to the minimum slack time T of all pins in the netlist. The pin or pins having the least slack time have the most critical timing since these pins are the most likely pins to have timing violations. In the above example, the total slack of logic design 700 is 9 (minimum of all slacks in Table 5), and the critical path consists of points B, D and F since these points have minimal slack. At step 605, algorithm 600 determines whether the current value of SLACK is greater than all previous values of SLACK. The greater the slack, the more comfortable the timing margin. If the current SLACK value is greater than all previous values obtained in previous iterations through algorithm 600, algorithm 600 stores the current penalty and delay vectors for the tree structures being optimized, at step 606. If not, algorithm 600 proceeds directly to step 607.

At step 607, if the present value of SLACK is greater than or equal to a predetermined slack constraint for the design or if the iteration count K is equal to the maximum number of iterations, algorithm 600 terminates at step 608. The maximum number of iterations is determined based on the point at which further iterations through algorithm 600 will likely not result in greater slack. The maximum number of allowed iterations also limits the maximum time at which algorithm 600 takes to complete.

If, at step 607, the SLACK value is not yet greater than or equal to the slack constraint and the iteration count has not yet reached the maximum allowed count, algorithm 600 penalizes critical pins by increasing their corresponding penalty value $p_i$ by a number such as "1", at step 609. In one embodiment, critical pins are identified by comparing the slack time, T, of each pin with the value of SLACK. If the slack time T of a pin equals the value of SLACK, then that pin is on a critical path and its penalty value is increased by one. This value is increased in the penalty vector for the gate tree or buffer tree having that pin.

At step 610, the iteration count K is increased by one, and algorithm 600 returns to step 602 where new delay vectors are computed based on the newly updated penalty vectors. Again, at step 603, for each pin in the netlist, algorithm 600 computes a new arrival time $T_1$, a new required arrival time $T_2$, and a new pin slack value T. At step 604, the algorithm determines the minimum slack value SLACK. If the minimum slack value SLACK is greater than all previous slack values, at step 605, the current penalty and delay vectors are stored at step 606, and represent an improvement on the design's timing (e.g., delay or slack). This process repeats until the minimum slack value is greater than or equal to the slack constraint or the maximum number of iterations has been reached at step 607.

Once algorithm 600 has terminated, at step 608, the most currently stored delay vectors are used to generate an optimal circuit configuration for each of the multi-input and multi-fanout blocks under consideration that implements an approximation of the desired delays between respective inputs and outputs. Having an estimation of the delays between respective inputs and outputs of the block, a best-fit approach, for example, can be used to implement the block with a given technology library or a generic library. Other approaches for implementing each block can also be used. A suitable circuit configuration is possible since all of the delay vectors that were considered by algorithms 400 and 500 in FIGS. 4 and 5 satisfied the inequalities discussed above.

The result is a globally optimal expansion of large, multi-input logic blocks and multi-fanout buffer trees. Thus, prior to placement and route, the netlist can been optimized for timing, and the resulting delay vectors can provide very good initial delay estimates for consideration during subsequent placement and routing steps. Placement and routing can then be timing-driven from the beginning. This allows a more effective initial placement and route.

The basic algorithms shown in FIGS. 4–6 can be modified in many different ways. For example, algorithm 600 shown in FIG. 6 can be modified to attain faster convergence on the given slack constraint by increasing the penalty value by a number other than one, such as a positive random number, at step 609. This random number would be picked randomly from a predetermined range of positive numbers. Also, this number does not need to be an integer value. At step 607, if algorithm 600 can terminate prior to executing the maximum number of iterations if there is no observed improvement in delay over a certain number of iterations. This can further bring down the execution time.

In addition, a variety of methods can be used to determine whether a particular pin or pins are "critical". In an alternative embodiment, the algorithm does not consider only the "most critical" pin or pins for which T=SLACK. Instead, the algorithm tracks all pins within a certain range of SLACK. For example, all pins having a slack time that is less than 10 percent greater than SLACK are considered critical. In another alternative embodiment, the range of pins considered to be critical decreases as the iteration count increases. For example, algorithm 600 can track all pins with T<(K+1)SLACK/K in the K-th iteration. In other embodiments, different criteria for identifying critical pins can be used in different iterations through algorithm 600.

Also, the abstract model used by the optimization algorithm can be generalized from binary input gates and binary output buffers to $Z_1$-input gates and $Z_2$-output buffers, respectively. In this case, $D_1$=delay/$\log_2 Z_1$ and $D_2$=delay/$\log_2 Z_2$. Equations 4 and 6 would be changed to $d_i \geq D_1 \log_2 Z_1$ and $d_i \geq D_2 \log_2 Z_2$, respectively. In FIG. 4, the value p/2 in step 402 would be replaced with p/$Z_1$, and in FIG. 5, the value p/2 in step 502 would be replaced with p/$Z_2$.

The optimization technique considers a "continuous space" of delay vectors of multi-input and multi-fanout blocks. The algorithm investigates different optimization outcomes, which yields a continuous space of delay values, as opposed to a discrete set of delay values that would normally be obtained when considering gate and fanout delays. The continuous set of delay values are essentially points on the operating locus defined by two inequalities. In existing delay models, the delay values can be defined only in terms of integer multiples of gate and/or fanout buffer delays.

The algorithm increases individual penalty values monotonically for pins that are in critical paths in subsequent iterations. Larger penalty values for a particular pin indicate that this pin is on a critical path more frequently than the pins with smaller penalty values. The highest penalty value or values in any iteration identifies the critical path or paths for that iteration. These paths are then optimized more aggressively. The algorithm therefore penalizes proportionately the paths that have been "critical" in past iterations more often than other paths, as opposed to concentrating on a current "critical" path only. Since in most circuits, only a few paths turn out to be comparably "critical", the algorithm tracks the delay behavior of all such paths in subsequent iterations. The algorithm ensures that these paths are optimized more heavily in these subsequent iterations. The algorithm optimizes both multi-input and multi-output logic blocks simultaneously as opposed to optimizing them in separate sequential phases. The optimization algorithm determines the best choice of delay co-efficients that can minimize the total delay in the netlist. These delay co-efficients can then be used to optimally generate or expand the multi-input logic blocks and multi-fanout blocks into combinational logic trees and buffer trees and to provide better delay estimates for driving subsequent placement and routing steps. The quality of the initial placement and routing steps are therefore greatly improved.

Although the present invention has been described with reference to preferred embodiments, workers skilled in the art will recognize that changes may be made in form and detail without departing from the spirit and scope of the invention.

What is claimed is:

1. A method of optimizing a functional block within a netlist of an integrated circuit design, the method comprising:
    (a) defining a continuous set of possible combinations in which each combination in the set satisfies a predetermined criteria and assigning a corresponding delay value to each of a plurality of pins of the block, wherein each pin corresponds to a respective signal path through the block and wherein the delay values together form a delay value combination that is selected from the continuous set of possible combinations; and
    (b) generating a circuit configuration for the block with a plurality of logic cells that are interconnected in the netlist such that the respective signal paths through the block have delays based on the corresponding delay values assigned in step (a).

2. The method of claim 1 wherein:
    each of the logic cells in step (b) has an estimated base delay $D_1$;
    each delay value, $d_i$, in the delay value combination in step (a) satisfies a first inequality in which, $$d_i \geq D_1$$

wherein i is an integer variable from 1 to N and N is the number of the plurality of pins; and
    the delay value combination in step (a) satisfies a second inequality in which, $$\sum_{i=1}^{N} \frac{1}{2^{d_i/D_1}} \leq 1.$$

3. The method of claim 1, wherein the method is performed to optimize a plurality of functional blocks within the netlist and the method further comprises:
    (c) for each of the plurality of functional blocks, assigning a current penalty value to each of the plurality of pins of that block;
    (d) assigning, in step (a), a corresponding delay value to each of the plurality of pins of each of the plurality of functional blocks based on the current penalty value for that pin;
    (e) identifying at least one of the pins of at least one of the plurality of blocks as a critical pin in the netlist;
    (f) updating the current penalty value of the at least one critical pin based on a history of that pin being identified as the critical pin in step (e);
    (g) repeating step (d) using the current penalty value updated in step (f); and
    (h) performing step (b) for each of the plurality of functional blocks based on the corresponding delay values assigned in step (d) for that block.

4. The method of claim 3 wherein step (d) of assigning a corresponding delay value comprises, for each of the plurality of blocks:

(d) (1) filtering the current penalty values of the block according to a filter function to produce a filtered penalty value for each of the plurality of pins of the block; and (d)(2) assigning the current delay values of the block based on the corresponding filtered penalty values of the block.

5. The method of claim 4 wherein step (d)(1) comprises:

(d) (1) (i) adding the plurality of current penalty values of the block to produce a penalty sum; and (d) (1) (ii) for each of the current penalty values of the block, replacing that current penalty value with the minimum of that current penalty value and one-half of the penalty sum.

6. The method of claim 3 wherein step (d) of assigning a current delay value comprises for each of the plurality of blocks:

(d)(1) adding the plurality of current penalty values of the block to produce a penalty sum; and (d) (2) for each of the plurality of pins of the block, (i) calculating the current delay value for that pin based on a log function of the penalty sum divided by the current penalty value corresponding to that pin, and (ii) multiplying a result of the log function by an estimated delay through an individual one of the logic cells within the block.

7. The method of claim 3 wherein step (e) comprises identifying at least one of the pins of at least one of the plurality of blocks as a critical pin in the netlist based on estimated timing data associated with the plurality of pins of the plurality of blocks, given the delay values assigned to the plurality of pins of the plurality of blocks in step (d).

8. The method of claim 3 wherein the updating step (f) comprises, for each of the plurality of blocks, applying the current penalty value of the at least one critical pin to a function to generate a new penalty value, which replaces the current penalty value of that pin.

9. The method of claim 8 wherein the function monotonically changes the current penalty value of the at least one critical pin by a selected update value.

10. The method of claim 9 wherein the selected value is a value selected randomly from a range of update values.

11. The method of claim 1 wherein the functional block comprises a logic block having multiple inputs, which are logically coupled to at least one common output of the block through the respective signal paths, and wherein the multiple inputs define the plurality of pins at which the corresponding delay values are assigned in step (a).

12. The method of claim 1 wherein the functional block comprises a fanout distribution block having multiple outputs, which are logically coupled to a common input of the block through the respective signal paths, and wherein the multiple outputs define the plurality of pins at which the corresponding delay values are assigned in step (a).

13. A method of optimizing a functional block within a netlist of an integrated circuit design, the method comprising:

(a) assigning a current penalty value to each of a plurality of pins of the block, wherein each pin corresponds to a respective signal path through the block;

(b) assigning a current delay value to each of the plurality of pins of the block based on the corresponding current penalty value;

(c) identifying at least one of the pins as a critical pin in the netlist;

(d) updating the current penalty value of the at least one critical pin based on a history of the respective pin being identified as the critical pin in step (c);

(e) repeating step (b) using the current penalty value updated in step (d); and (f) generating an internal circuit configuration for the block with logic cells that are interconnected in the netlist such that the respective signal paths through the block have delays that are based on the current delay values.

14. The method of claim 13 wherein step (b) of assigning a current delay value comprises:

(b) (1) selecting a combination of the delay values for the plurality of pins of the block from a continuous set of possible delay combinations that satisfy a predetermined criteria.

15. The method of claim 14 wherein each of the logic cells has an estimated base delay $D_1$ and wherein:

(b) (1) (i) each delay value, $d_i$, in the combination satisfies a first inequality in which, $$d_i \geq D_{1i}$$

wherein i is an integer variable from 1 to N and N is the number of the plurality of pins; and (b) (1) (ii) the combination of the delay values satisfies a second inequality in which, $$\sum_{i=1}^{N} \frac{1}{2^{d_i/D_1}} \leq 1.$$

16. The method of claim 13 wherein step (b) of assigning a current delay value comprises:

(b) (1) filtering the current penalty values of the block according to a filter function to produce a filtered penalty value for each of the plurality of pins of the block; and (b)(2) assigning the current delay values of the block based on the corresponding filtered penalty values.

17. The method of claim 16 wherein step (b)(1) comprises:

(b)(1)(i) adding the plurality of current penalty values for the block to produce a penalty sum; and (b)(1)(ii) for each of the current penalty values, replacing the current penalty value with the minimum of the current penalty value and one-half of the penalty sum.

18. The method of claim 13 wherein step (b) of assigning a current delay value comprises:

(b) (1) adding the plurality of current penalty values for the block to produce a penalty sum; and (b) (2) for each of the plurality of pins, (i) calculating the current delay value for that pin based on a log function of the penalty sum divided by the current penalty value corresponding to that pin, and (ii) multiplying a result of the log function by an estimated delay through an individual one of the logic cells within the block.

19. The method of claim 13 wherein step (c) comprises identifying at least one of the pins as a critical pin in the netlist based on estimated timing data associated with the plurality of pins.

20. The method of claim 13 wherein the updating step (d) comprises applying the current penalty value of the critical pin to a function to generate a new penalty value, which replaces the current penalty value of that pin.

21. The method of claim 20 wherein the function monotonically changes the current penalty value of the critical pin by a selected update value.

22. The method of claim 21 wherein the selected value is a value selected randomly from a range of update values.

23. The method of claim 21 wherein steps (h), (i), (j), and (k) are repeated until a predetermined criteria is met before performing step (l).

24. The method of claim 13, wherein the method is performed to optimize a plurality of functional blocks within the netlist and the method further comprises:
  (g) assigning, in step (a), for each of the plurality of functional blocks, a current penalty value to each of the plurality of pins of that block;
  (h) assigning, in step (b), for each of the plurality of functional blocks, a current delay value to each of the plurality of pins of that block based on the corresponding penalty value for that pin;
  (i) identifying, in step (c), at least one of the pins of at least one of the plurality of blocks as a critical pin in the netlist;
  (j) updating, in step (d), the current penalty value of the at least one critical pin based on a history of that pin being identified as the critical pin in step (i);
  (k) repeating step (h) using the current penalty value updated in step (j); and
  (l) performing step (f) for each of the plurality of functional blocks based on the corresponding current delay values for that block.

25. The method of claim 13 wherein the functional block comprises a logic block having multiple inputs, which are logically coupled to at least one common output of the block through the respective signal paths, and wherein the multiple inputs define the plurality of pins at which the current penalty values and the current delay values are assigned in steps (a) and (b), respectively.

26. The method of claim 13 wherein the functional block comprises a fanout distribution block having multiple outputs, which are logically coupled to a common input of the block through the respective signal paths, and wherein the multiple outputs define the plurality of pins at which the current penalty values and the current delay values are assigned in steps (a) and (b), respectively.

27. A computer-readable medium comprising instructions readable by a computer-aided design tool for optimizing a functional block within a netlist of an integrated circuit which, when executed, cause the tool to perform steps comprising:
  (a) assigning a current penalty value to each of a plurality of pins of the block, wherein each pin corresponds to a respective signal path through the block;
  (b) assigning a current delay value to each of the plurality of pins of the block based on the corresponding current penalty value;
  (c) identifying at least one of the pins as a critical pin in the netlist;
  (d) updating the current penalty value of the at least one critical pin based on a history of the respective pin being identified as the critical pin in step (c);
  (e) repeating step (b) using the current penalty value updated in step (d); and
  (f) generating a circuit configuration for the block with logic cells that are interconnected in the netlist such that the respective signal paths through the block have delays that are based on the current delay values.

28. An integrated circuit netlist comprising a functional block, which is optimized by a process comprising:
  (a) assigning a current penalty value to each of a plurality of pins of the block, wherein each pin corresponds to a respective signal path through the block;
  (b) assigning a current delay value to each of the plurality of pins of the block based on the corresponding current penalty value;
  (c) identifying at least one of the pins as a critical pin in the netlist;
  (d) updating the current penalty value of the at least one critical pin based on a history of the respective pin being identified as the critical pin in step (c);
  (e) repeating step (b) using the current penalty value updated in step (d); and
  (f) generating a circuit configuration for the block with logic cells that are interconnected in the netlist such that the respective signal paths through the block have delays that are based on the current delay values.

* * * * *